E. ROWE.
Axle Box.

No. 101,663.

Patented April 5, 1870.

Witnesses:
Harry King
C. L. Ewert

Inventor:
Elias Rowe
per
Alexander Mason
Atty

United States Patent Office.

ELIAS ROWE, OF VANDALIA, ILLINOIS.

Letters Patent No. 101,663, dated April 5, 1870.

IMPROVEMENT IN VEHICLES.

The Schedule referred to in these Letters Patent and making part of the same.

Be it known that I, ELIAS ROWE, of Vandalia, in the county of Fayette and in the State of Illinois, have invented certain new and useful Improvements in Vehicles; and do hereby declare that the following is a full, clear, and exact description thereof, reference being had to the accompanying drawings and to the letters of reference marked thereon making a part of this specification.

The nature of my invention consists in the application of two small wheels or rollers above the axle of a vehicle, and in the construction of the devices hereinafter set forth.

In order to enable others skilled in the art to which my invention appertains to make and use the same, I will now proceed to describe its construction and operation, referring to the annexed drawings in which—

Figure 1:
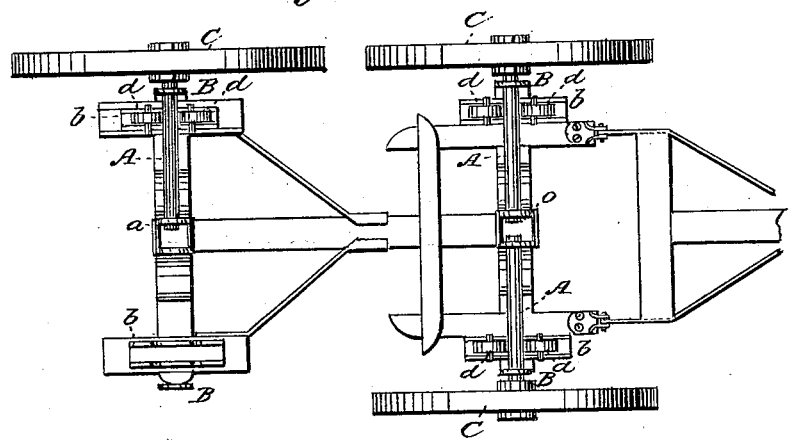
Figure 1 is a bottom view of a vehicle.

The axle A is made in two parts, as shown in fig. 1, the inner ends of the two halves of the axle being confined in a box, $a$, which is so constructed that it forms a band on each side, which band fits in a groove on the inner end of the axle, thereby holding the axle so as to prevent any lateral motion, but allowing it to revolve freely within the same.

The box $a$ is secured on the under side of the wagon-bed, so that the axle, instead of passing through or being brought to the bed, will be under the same.

On the side of the wagon-bed is secured a box or bracket, $b$, which is cut out on its lower edges, so as to form the upper bearings for the journals of two small wheels or rollers, $d\ d$, placed in the same.

Figures 2, 3:
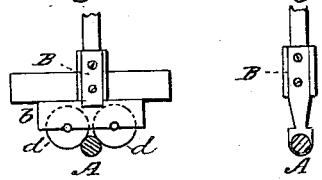
Figure 2 is a side view of the box or bracket containing the two wheels or rollers above the axle.
Figure 3 is a side view of a bar, through which the outer ends of the axle pass.
Figure 4:
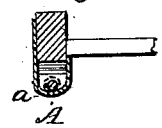
Figure 4 is a vertical section of the central box, through which the inner ends of the axles are held.

These rollers are so arranged as to bear against the upper side of the axle A, one on each side, as is fully shown in fig. 2, the axle thus keeping said rollers in their places within the bracket.

The outer end of the axle A, after having crossed the line of the two wheels, $d\ d$, passes through a metal bar or guide, B, secured to the wagon-bed, and has the wheel C firmly secured to it outside of said guide.

This arrangement may be applied to anything on wheels, and saves a great deal of the draft, also considerable of the wear and tear of the running-gear.

Not so much lubricating is needed, and vehicles running on this plan will neither heat the box or journal, nor burn grease like the old plan.

Having thus fully described my invention,

What I claim as new, and desire to secure by Letters Patent, is—

The combination of the bisected axle A, with guides B B, brackets $b\ b$, friction-wheels $d\ d$, and central box $a$ formed of a metal bracket, and slotted strap for securing the inner flanged ends of the axles, substantially as set forth.

In testimony that I claim the foregoing, I have hereunto set my hand this 4th day of October, 1870.

ELIAS ROWE.

Witnesses:
WM. S. LIVINGSTON,
SAMUEL A. FASIG.